US012000196B2

(12) United States Patent
Machii

(10) Patent No.: US 12,000,196 B2
(45) Date of Patent: Jun. 4, 2024

(54) OPENING AND CLOSING BODY CONTROL APPARATUS

(71) Applicant: Noriyoshi Machii, Aichi (JP)

(72) Inventor: Noriyoshi Machii, Aichi (JP)

(73) Assignee: NIDEC MOBILITY CORPORATION, Aichi (JP)

( * ) Notice: Subject to any disclaimer, the term of this patent is extended or adjusted under 35 U.S.C. 154(b) by 107 days.

(21) Appl. No.: 17/549,865

(22) Filed: Dec. 14, 2021

(65) Prior Publication Data

US 2022/0195782 A1 Jun. 23, 2022

(30) Foreign Application Priority Data

Dec. 22, 2020 (JP) ................................ 2020-212167

(51) Int. Cl.
*E05F 15/00* (2015.01)
*E05F 15/40* (2015.01)
*E05F 15/695* (2015.01)
*E05F 15/697* (2015.01)

(52) U.S. Cl.
CPC ............ *E05F 15/695* (2015.01); *E05F 15/40* (2015.01); *E05F 15/697* (2015.01); *E05Y 2201/434* (2013.01); *E05Y 2201/654* (2013.01); *E05Y 2400/31* (2013.01); *E05Y 2400/334* (2013.01); *E05Y 2400/36* (2013.01); *E05Y 2400/40* (2013.01); *E05Y 2400/45* (2013.01); *E05Y 2400/54* (2013.01); *E05Y 2900/55* (2013.01)

(58) Field of Classification Search
CPC ....... E05F 15/695; E05F 15/40; E05F 15/697; E05Y 2201/434; E05Y 2400/36; E05Y 2400/40; E05Y 2400/45; E05Y 2400/54
See application file for complete search history.

(56) References Cited

U.S. PATENT DOCUMENTS 7,701,157 B2 4/2010 Shimomura et al.
2005/0288840 A1* 12/2005 Suzuki .................. B60J 7/0573 701/49
2020/0284085 A1 9/2020 Homma et al.

FOREIGN PATENT DOCUMENTS

JP 2002194947 * 7/2002
JP 2003182368 * 7/2003
JP 2004183428 * 7/2004
JP 2005194744 * 7/2005
JP 2007270523 A 10/2007
JP 2016200041 * 12/2016 .......... Y02T 10/144
(Continued)

*Primary Examiner* — Daniel J Troy
*Assistant Examiner* — Daniel Alvarez
(74) *Attorney, Agent, or Firm* — HAUPTMAN HAM, LLP

(57) ABSTRACT

An opening and closing body control apparatus includes a motor driving unit and a control unit. The motor driving unit outputs a predetermined application voltage to the motor, based on a control command from the control unit. The control unit is configured to: when an opening and closing body reaches a first position in front of a closing-up position, set a target speed of the motor to a closing-up time target speed at which a torque required for closing-up the opening and closing body is secured, and perform feedback control on the motor driving unit; and when the opening and closing body reaches a second position closer to the closing-up position than the first position, stop the feedback control, and control the motor driving unit so that the application voltage of the motor at the time is held.

5 Claims, 13 Drawing Sheets

(56) References Cited

FOREIGN PATENT DOCUMENTS

| | | | | | |
|---|---|---|---|---|---|
| JP | 202012279 | A | | 1/2020 | |
| JP | 2020122317 | A | | 8/2020 | |
| WO | WO-2019216119 | A1 | * | 11/2019 | .............. E05F 15/60 |

* cited by examiner

STOP POSITION
50c
Fb
Fc
Fb
W
Fa

CLOSING-UP POSITION
50c
Fb
Fb
W
Fa

50c
W
Fa

OPENING AND CLOSING BODY CONTROL APPARATUS

CROSS-REFERENCES TO RELATED APPLICATIONS

This application is based upon and claims the benefit of priority from Japanese Patent Application No. 2020-212167 filed on Dec. 22, 2020, the entire contents of which are incorporated herein by reference.

FIELD

One or more embodiments of the present invention relate to an apparatus that controls an opening and closing body which performs an opening and closing operation by driving a motor, and more particularly to a control technology of closing-up the opening and closing body.

BACKGROUND

For example, as an opening and closing body control apparatus mounted on a vehicle, there is a power window apparatus that controls an opening and closing operation of a window. In this apparatus, a motor is used as an actuator, and a window, which is an opening and closing body, is opened or closed by rotating the motor in a forward or reverse direction with a switch operation. Specifically, an opening and closing mechanism (regulator) that operates in conjunction with the motor is provided between the motor and the window, and when the motor rotates in the forward direction, the window rises via the opening and closing mechanism, and the window is closed. Further, when the motor rotates in the reverse direction, the window descends via the opening and closing mechanism, and the window is opened.

In order to reliably close the window in the closing operation of the window, even after an upper end portion of the window comes in contact with a rubber run channel provided in a window frame, the motor is continued to be driven, the window is completely pressed against the run channel, and the motor stalls and became locked, and the motor is stopped at that time. When a closing-up force of the window is small, a gap is created between the window and the window frame, and rainwater may enter the vehicle or wind noise may be generated from this gap.

JP-A-2007-270523, JP-A-2020-012279, and JP-A-2020-122317 disclose technologies of reliably closing-up windows. In JP-A-2007-270523 and JP-A-2020-012279, a window is completely closed by increasing an application voltage of a motor in a predetermined region in front of a full closing position of the window. According to JP-A-2020-122317, in a state in which the outside temperature deviates from room temperature, by making an application voltage of a motor higher than at room temperature, a decrease in a closing-up force of a window is suppressed.

Meanwhile, in order to reliably close-up the window, the application voltage of the motor is increased so that the window collides with the run channel at high speed, a strong reaction force from the run channel acts on the window. Further, in the power window apparatus, speed control of the motor is generally performed by feedback control. Therefore, when a speed of the motor falls below a target speed due to a friction or the like between the window and the run channel immediately before a closing-up position, feedback control for maintaining the speed works and the application voltage of the motor is increased, so that the speed of the motor increases. As a result, the window hits the run channel vigorously, and receives a strong reaction force from the run channel.

The reaction force as described above may be applied to a door from the window via the opening and closing mechanism as an excessive mechanical stress, and may cause the door to be deformed. In particular, the higher the temperature and the higher the application voltage of the motor, the greater the reaction force acting on the window, and the excessive stress is applied to the opening and closing mechanism. Therefore, the power window apparatus requires an opening and closing mechanism that can withstand such an excessive stress, which increases the cost.

SUMMARY

An object according to one or more embodiments of the present invention is to provide an opening and closing body control apparatus capable of reliably closing-up an opening and closing body without generating an excessive mechanical stress.

According to an aspect of the present invention, there is provided an opening and closing body control apparatus including: a motor driving unit that drives a motor to open and close an opening and closing body; and a control unit that controls an operation of the motor driving unit. The motor driving unit outputs a predetermined application voltage to the motor, based on a control command from the control unit. The control unit is configured to, when the opening and closing body reaches a first position in front of a closing-up position, set a target speed of the motor to a closing-up time target speed at which a torque required for closing-up the opening and closing body is secured, and perform feedback control on the motor driving unit. The control unit is configured to, when the opening and closing body reaches a second position closer to the closing-up position than the first position, stop the feedback control, and control the motor driving unit so that the application voltage of the motor at the time of stopping the feedback control is held.

In this manner, between the first position and the second position, the target speed of the motor is set to the closing-up time target speed at which the torque required for closing-up the opening and closing body is secured, and feedback control is performed based on the target speed. Further, at the second position, the feedback control is stopped, and the application voltage held at this time causes the motor to rotate at a constant speed thereafter. As a result, the opening and closing body hits a run channel at the minimum necessary constant speed, and the speed of the motor does not increase immediately before the closing-up position by the feedback control being stopped, so that a reaction force acting on the opening and closing body from the run channel is suppressed. Meanwhile, since a force required to close the opening and closing body is secured, it is possible to reliably close the opening and closing body.

In the opening and closing body control apparatus according to the aspect of the present invention, in which the motor driving unit may be configured to output the held application voltage to the motor during a time from when the opening and closing body reaches the second position to when the opening and closing body reaches a stop position further on a closing side than the closing-up position, and when the opening and closing body reaches the stop position and stops, stop the output of the held application voltage.

In the opening and closing body control apparatus according to the aspect of the present invention, in which the control unit may be configured to while the opening and closing body is in a region in front of the first position, perform feedback control on the motor driving unit, based on a normal target speed larger than the closing-up time target speed.

In the opening and closing body control apparatus according to the aspect of the present invention, in which the control unit may be configured to while the opening and closing body is in a region in front of the first position, control the motor driving unit so that the application voltage of the motor becomes a maximum voltage.

The opening and closing body control apparatus according to the aspect of the present invention, may further include: a jam detection unit that detects that a foreign object is jammed during a closing operation of the opening and closing body, in which a prohibition region for prohibiting detection by the jam detection unit may be set in front of the closing-up position of the opening and closing body, and the second position may be a position of the opening and closing body when the opening and closing body reaches the prohibition region.

In the opening and closing body control apparatus according to the aspect of the present invention, in which the control unit may be configured to when the opening and closing body reaches the first position, gradually reduce the target speed of the motor until that time, and when the target speed drops to a certain value, set a target speed at that time as the closing-up time target speed.

According to one or more embodiments of the present invention, it is possible to provide an opening and closing body control apparatus that reliably closes an opening and closing body without generating an excessive mechanical stress.

DETAILED DESCRIPTION

In embodiments of the invention, numerous specific details are set forth in order to provide a thorough understanding of the invention. However, it will be apparent to one of ordinary skill in the art that the invention may be practiced without these specific details. In other instances, well-known features have not been described in detail to avoid obscuring the invention.

Embodiments of the present invention will be described with reference to the drawings. In the following, as an opening and closing body control apparatus, a power window apparatus mounted on a vehicle will be given as an example.

Figure 1:
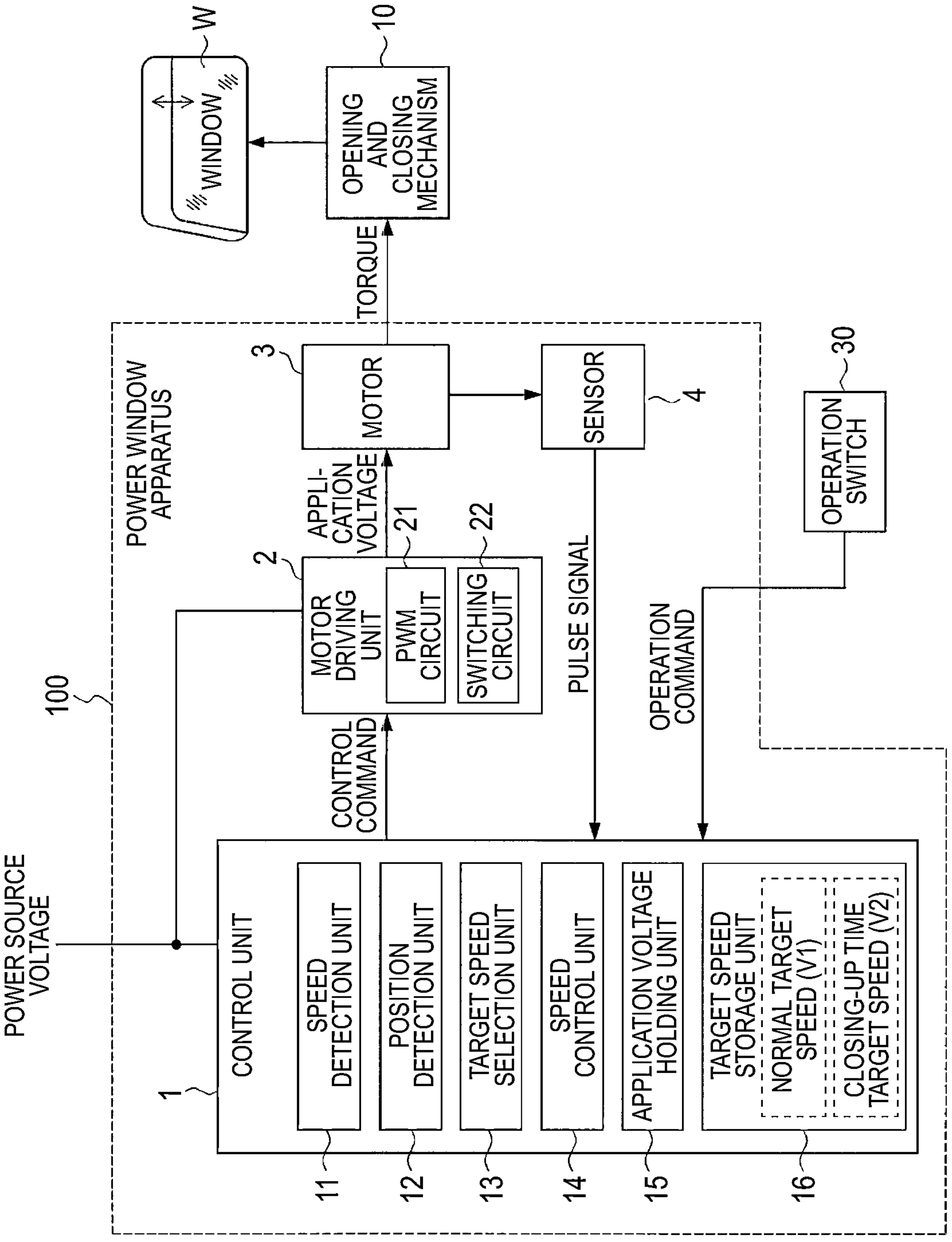
FIG. 1 is a block diagram illustrating a first embodiment of the present embodiment.

FIG. 1 illustrates a power window apparatus according to a first embodiment of the present embodiment. The power window apparatus 100 is an apparatus that operates an opening and closing mechanism 10 by operating an operation switch 30 to open and close a window W of a vehicle. The power window apparatus 100 includes a control unit 1, a motor driving unit 2, a motor 3, and a sensor 4. The window W is an example of an "opening and closing body" according to the embodiment of the present invention.

The control unit 1 includes, for example, a microcomputer, and includes a speed detection unit 11, a position detection unit 12, a target speed selection unit 13, a speed control unit 14, an application voltage holding unit 15, and a target speed storage unit 16. A function of each block is realized by software. Although various blocks other than the above are provided in the control unit 1, the blocks are not illustrated since the blocks are not directly related to the embodiment of the present invention.

The speed detection unit 11 is a block that detects a rotation speed of the motor 3 based on a pulse signal input from the sensor 4, which will be described below. The position detection unit 12 is a block that detects a position of the window W based on the pulse signal. The target speed selection unit 13 is a block that selects any one of target speeds V1 and V2, which will be described below, stored in the target speed storage unit 16. The speed control unit 14 is a block that performs feedback control so that the rotation speed of the motor 3 is the target speed, based on a deviation between the target speed selected by the target speed selection unit 13 and the rotation speed of the motor 3 detected by the speed detection unit 11. The application voltage holding unit 15 is a block that holds the application voltage to the motor 3 at a voltage at a time when the window W reaches immediately before a closing-up position. The target speed storage unit 16 is a block that stores the normal target speed V1 and the closing-up time target speed V2.

The motor driving unit 2 operates based on a control command from the control unit 1, and supplies a predetermined application voltage to the motor 3. The motor driving unit 2 is provided with a pulse width modulation (PWM) circuit 21, and a switching circuit 22 including four bridge-connected field effect transistors (FETs).

The motor 3 includes a DC motor, and rotates at a predetermined speed based on the application voltage supplied from the motor driving unit 2. The rotation speed of the motor 3 increases as the application voltage increases. The opening and closing mechanism 10, which will be described below, is connected to the motor 3.

The sensor 4 includes a rotary encoder, a potentiometer, and the like, and detects a rotation state of the motor 3. Specifically, the sensor 4 generates a pulse signal synchronized with a rotation of the motor 3, and outputs the pulse signal to the control unit 1. The speed detection unit 11 of the control unit 1 detects the rotation speed of the motor 3, based on a pulse interval and the like of the pulse signal. The position detection unit 12 of the control unit 1 counts the number of rising and falling edges of the pulse signal, and detects the position of the window W based on the counted numerical value.

Figure 2A:
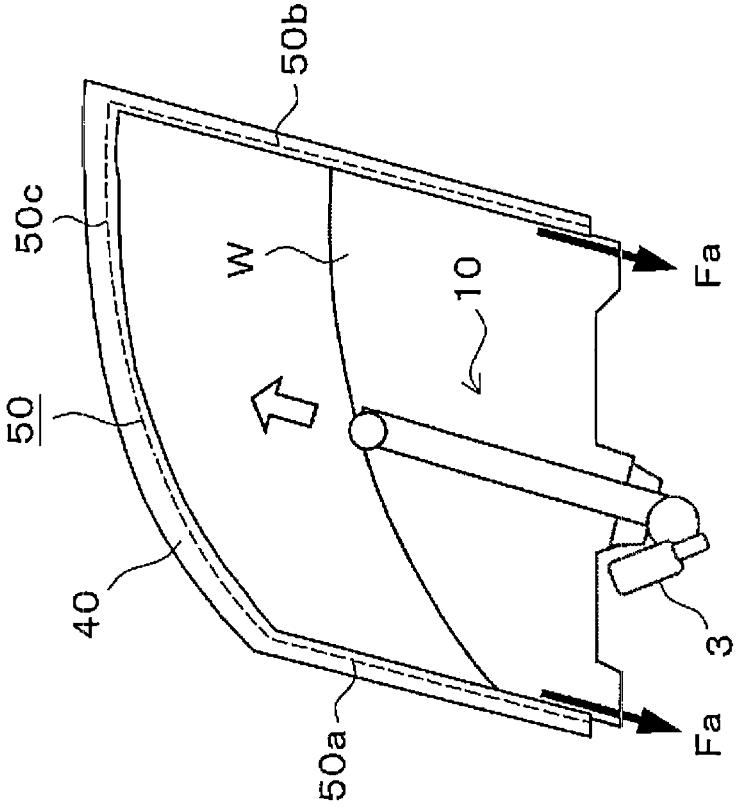
FIGS. 2A and 2B are schematic diagrams of an opening and closing mechanism.

The opening and closing mechanism 10 (regulator) operates in conjunction with the rotation of the motor 3 to open and close the window W. As illustrated in FIG. 2A, the opening and closing mechanism 10 is interposed between the motor 3 and the window W. The window W is vertically attached to the window frame 40 so as to fit into a groove of a rubber run channel 50 provided inside the window frame 40. Fa in FIG. 2A represents a force acting on the window W when the window W rises (details will be described below).

Figure 2B:
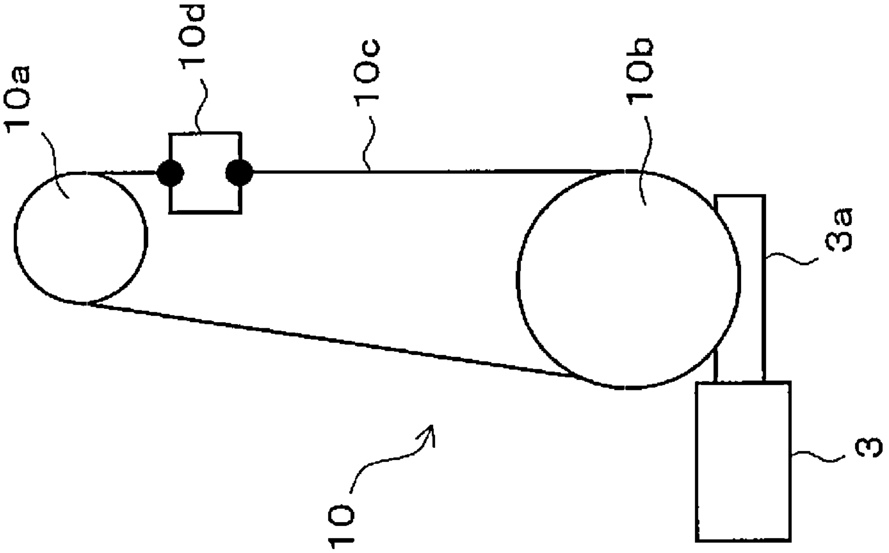

FIG. 2B illustrates an example of the opening and closing mechanism 10. The opening and closing mechanism 10 is configured with a first drum 10*a* located at the upper portion, a second drum 10*b* located at the lower portion, a wire 10*c* hung between the first drum 10*a* and the second drum 10*b*, and an elevating member 10*d* fixed to the wire 10*c*. The second drum 10*b* is connected to a rotary shaft 3*a* of the motor 3, and rotates as the motor 3 rotates. The elevating member 10*d* is connected to the window W, and moves in a vertical direction as the motor 3 rotates.

For example, when the motor 3 rotates in a normal direction, the second drum 10*b* rotates counterclockwise, and the elevating member 10*d* rises via the wire 10*c*. As a result, the window W rises together with the elevating member 10*d*, and is closed (closing operation). Further, when the motor 3 rotates in a reverse direction, the second drum 10*b* rotates clockwise, and the elevating member 10*d* descends via the wire 10*c*. As a result, the window W descends together with the elevating member 10*d*, and is opened (opening operation).

Figures 3A, 3B, 3C:
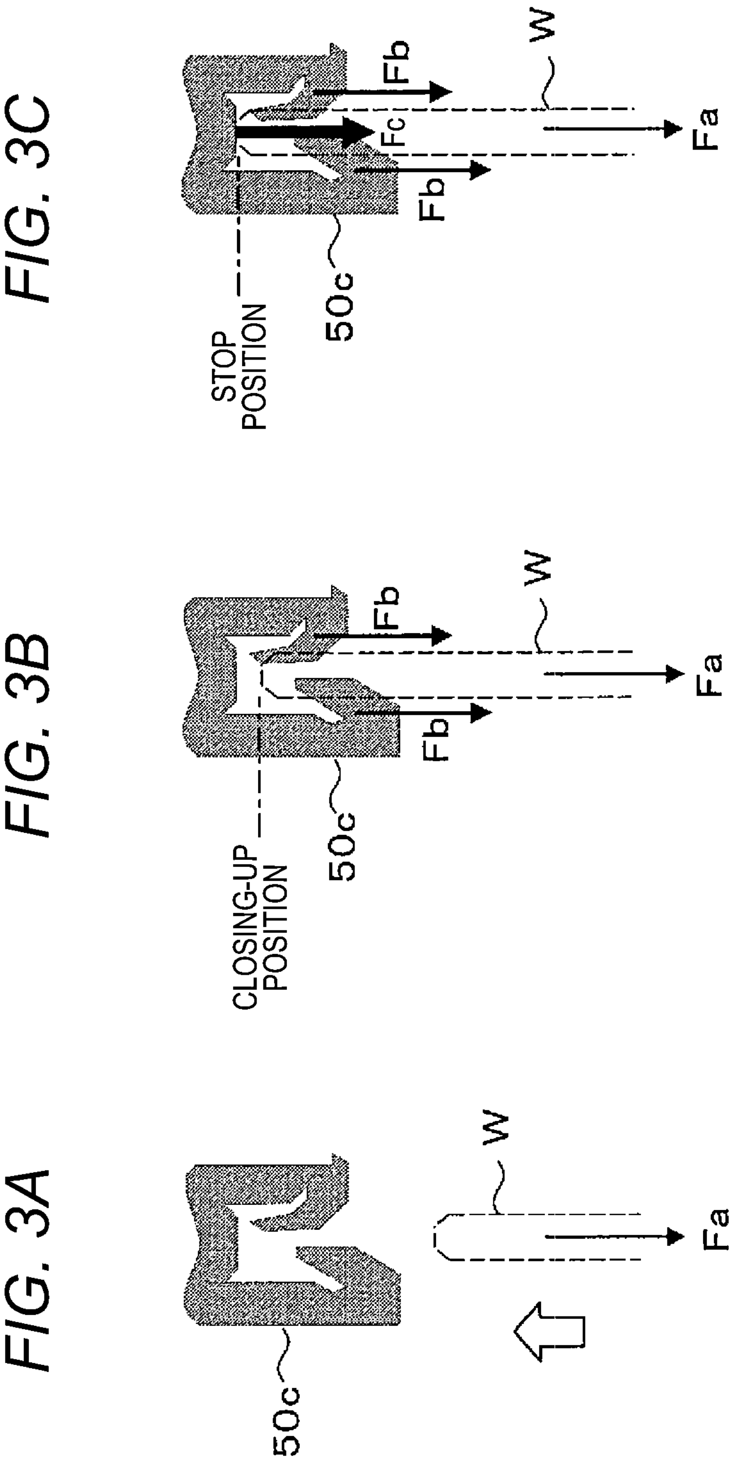
FIGS. 3A to 3C are diagrams illustrating a force acting on a window.

FIGS. 3A to 3C are diagrams illustrating a force acting on the window W in a case where the window W is closed. FIG. 3A illustrates a state in which the window W is rising, FIG. 3B illustrates a state in which the window W reaches a closing-up position, and FIG. 3C illustrates a state in which the window W further rises and reaches a stop position.

As illustrated in FIG. 3A, in a state in which the window W raises, a force acting on the window W is only a normal load force Fa. Therefore, as an output (torque) of the motor 3 at this time, motor output=normal load force Fa is obtained. The normal load force Fa is mainly from a friction between the front and rear run channels 50*a* and 50*b* illustrated in FIG. 2A and side portions of the window W, and a weight of a glass of the window W.

As illustrated in FIG. 3B, when the window W reaches the closing-up position, a force (closing-up force) Fb required for closing-up the window W acts on the window W in addition to the above-described normal load force Fa. Therefore, as the output (torque) of the motor 3 at this time, motor output=normal load force Fa+closing-up force Fb is obtained. The closing-up force Fb is from a friction between the upper run channel 50*c* illustrated in FIG. 2A and the upper end portion of the window W.

As illustrated in FIG. 3C, when the window W exceeds the closing-up position and reaches the stop position, an excess force Fc acts on the window W in addition to the above-described normal load force Fa and closing-up force Fb. Therefore, as the output (torque) of the motor 3 at this time, motor output=normal load force Fa+closing-up force Fb+excess force Fc is obtained. The excess force Fc is a reaction force received from the run channel 50*c* when the window W hits the upper run channel 50*c*, and the higher the speed of the window W, the larger the excess force Fc.

When the excess force Fc is applied to the window W as described above, the excess force Fc is transmitted to a door via the window frame 40, the opening and closing mechanism 10, a connection unit between the opening and closing mechanism 10 and the door of the vehicle (not illustrated), or the like, and as described at the beginning, it may cause deformation of the door. Therefore, in the embodiment of the present invention, when the window W reaches a predetermined position in front of the closing-up position, the speed of the motor 3 is reduced, and then when the window W approaches the closing-up position, the feedback control of the motor speed is stopped, so that the excess force Fc applied to the window W is suppressed. Hereinafter, details will be described with reference to FIGS. 4 to 7.

Figure 4:
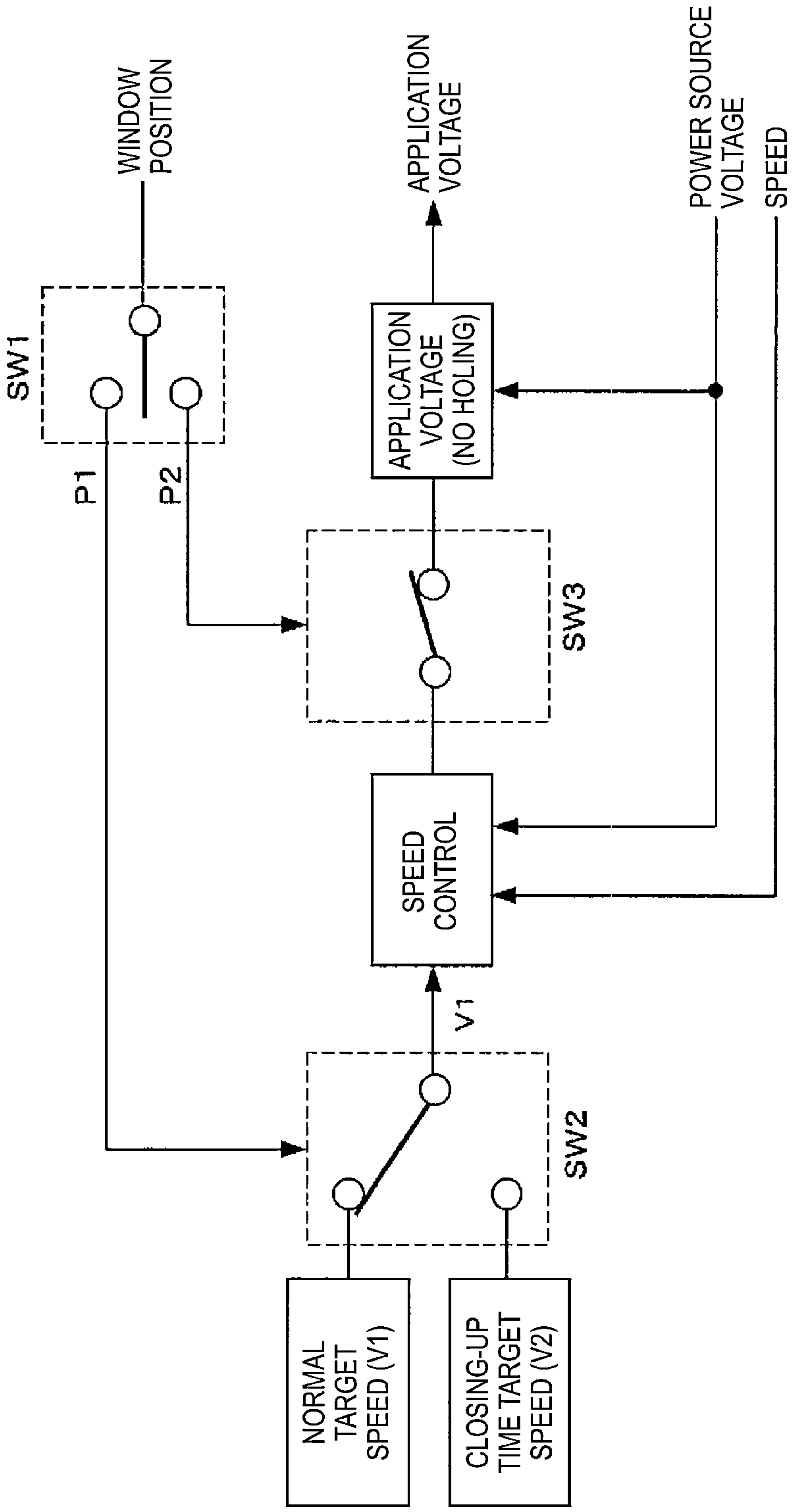
FIG. 4 is a diagram illustrating a control procedure according to the first embodiment.
Figure 5:
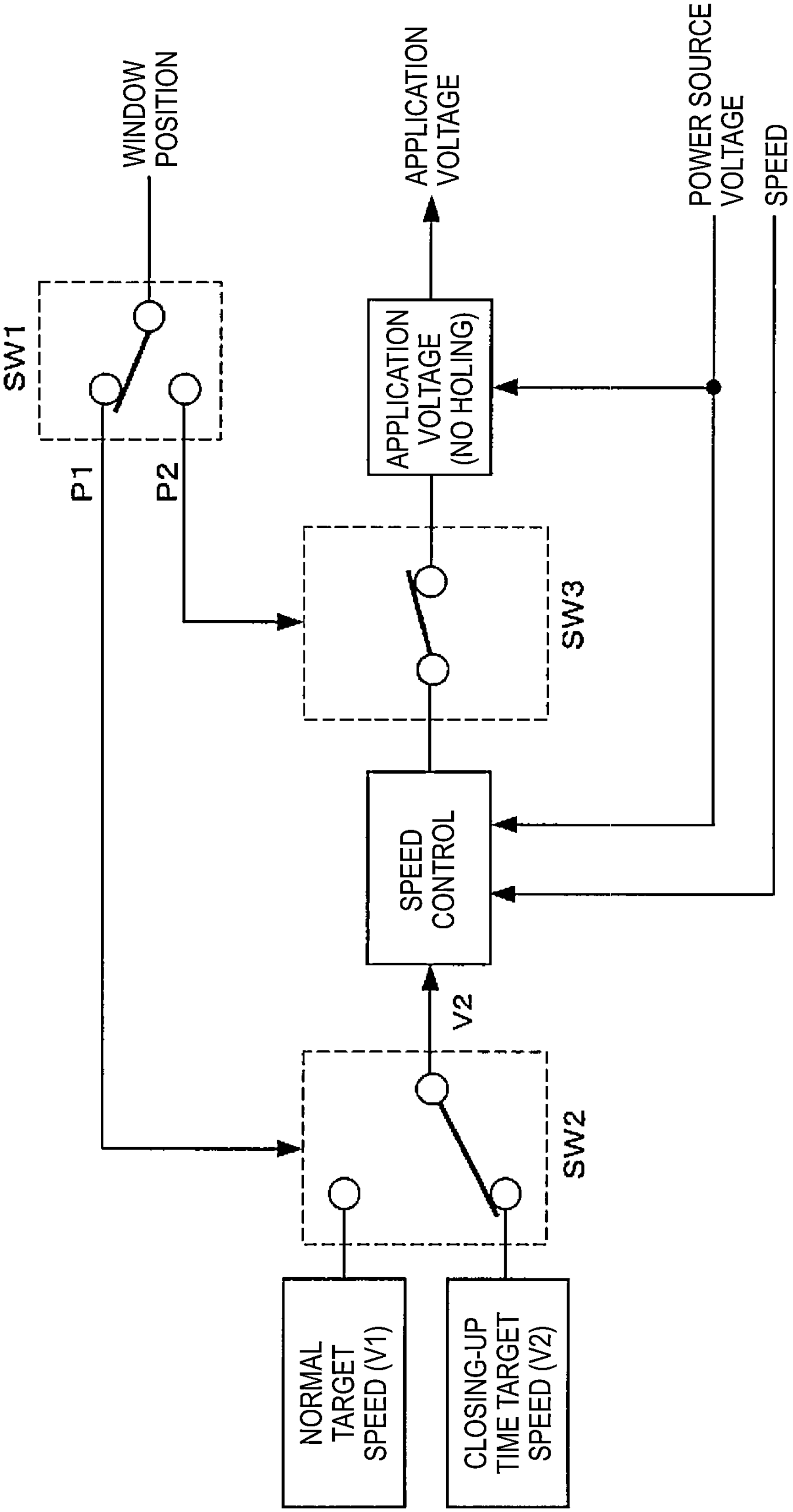
FIG. 5 is a diagram illustrating a control procedure following the continuation in FIG. 4.
Figure 6:
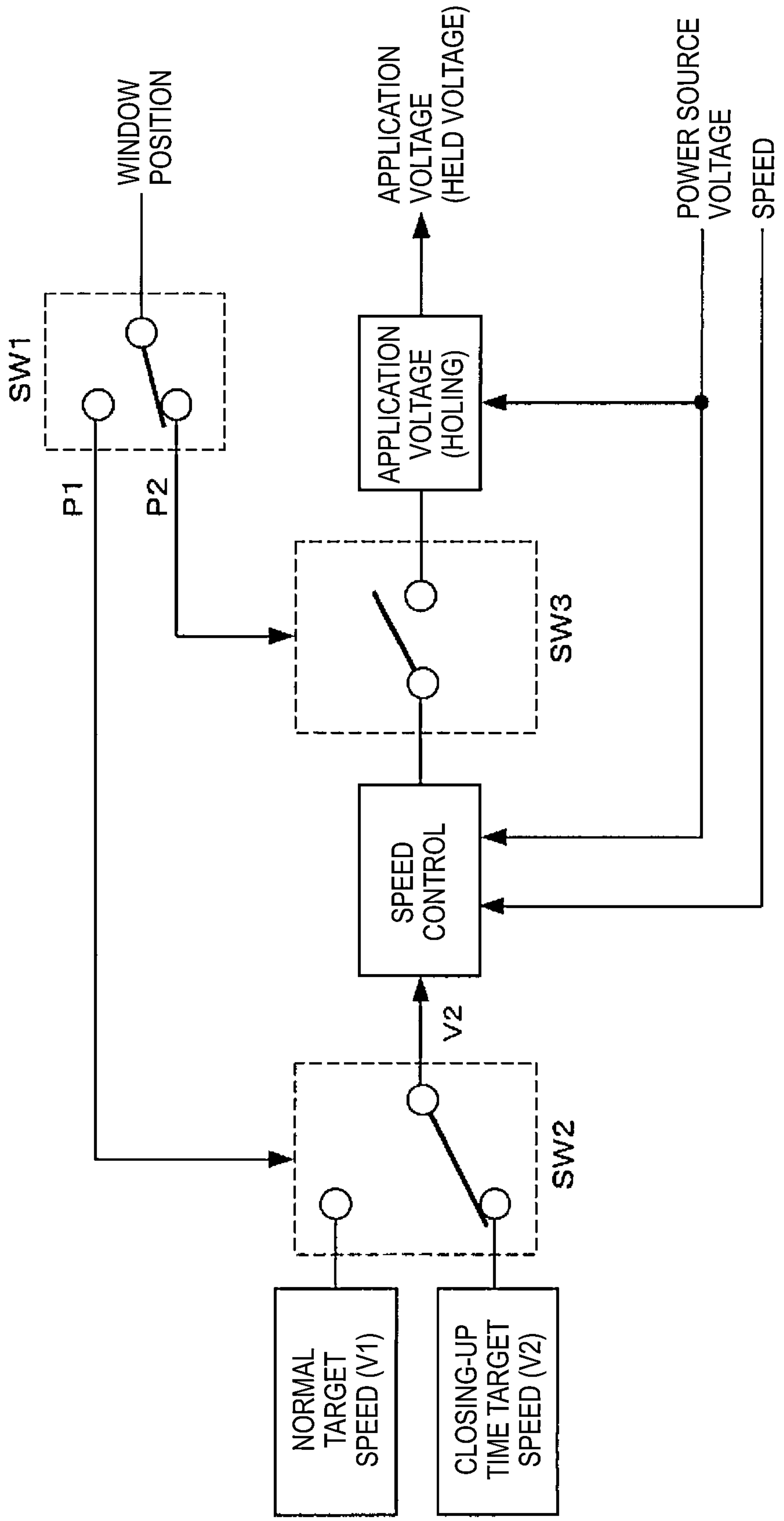
FIG. 6 is a diagram illustrating a control procedure following the continuation in FIG. 5.
Figure 7:
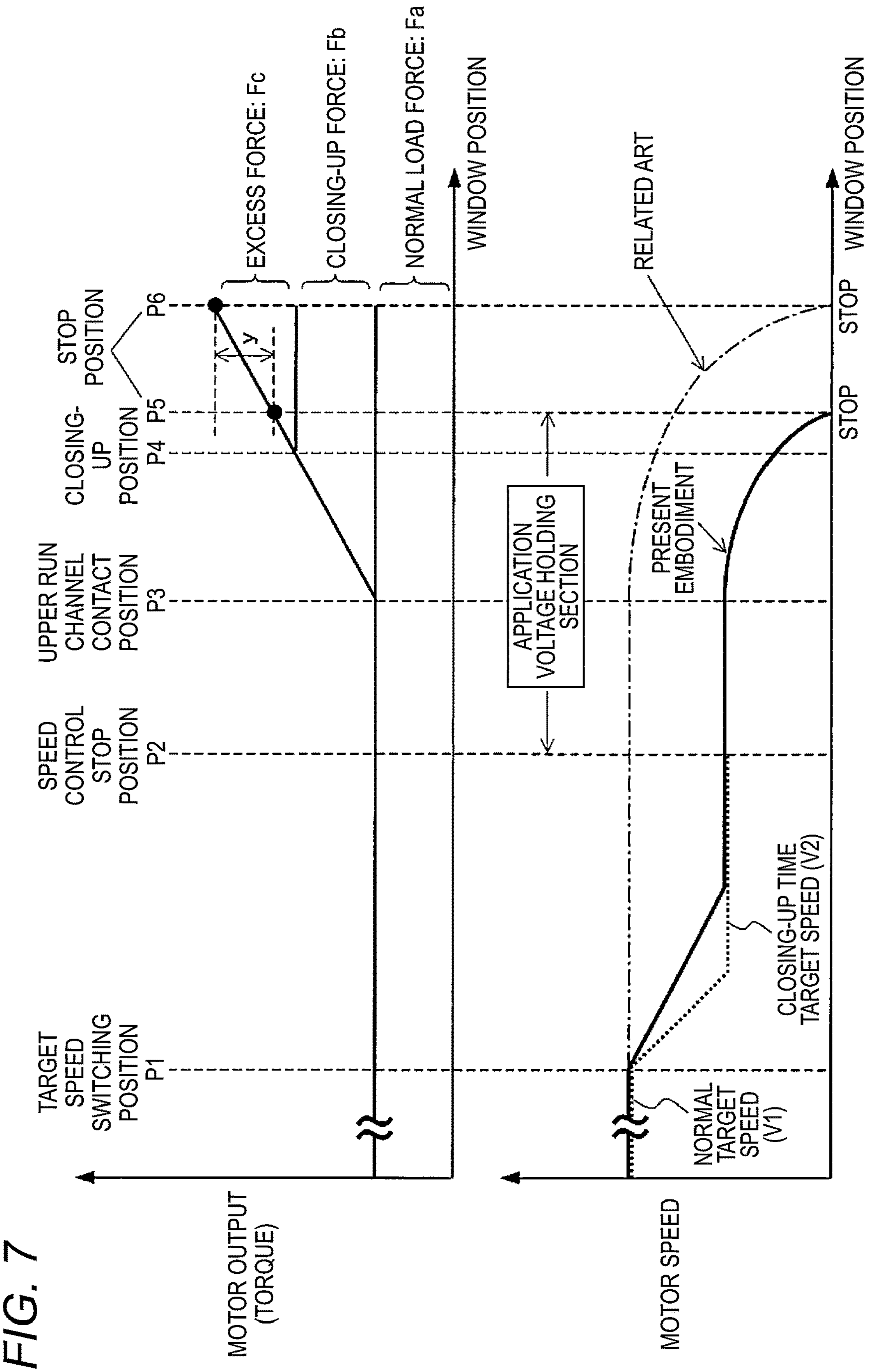
FIG. 7 is a diagram illustrating changes in an output and a speed of a motor with respect to a window position.

FIGS. 4 to 6 are diagrams illustrating a control procedure by the control unit 1 in FIG. 1. FIG. 7 is a diagram illustrating changes in an output (torque) and a speed of the motor 3 with respect to a position of the window W. Switches SW1 to SW3 illustrated in FIGS. 4 to 6 are for convenience of explanation, and these switches SW1 to SW3 are not actually provided in the configuration in FIG. 1 (the same applies to SW1 to SW4 in FIGS. 9 to 13).

The switch SW1 corresponds to the position detection unit 12 in FIG. 1, and is switched to a neutral position (FIG. 4), a P1 side (FIG. 5), and a P2 side (FIG. 6) according to the position of the window W. P1 and P2 respectively represent a target speed switching position and a speed control stop position illustrated in FIG. 7 (details will be described below).

The switch SW2 corresponds to the target speed selection unit 13 in FIG. 1, and switches the target speed of the motor 3 between the normal target speed V1 and the closing-up time target speed V2, according to a state of the switch SW1. Here, V1 and V2 have a relationship of V1>V2. Further, the closing-up time target speed V2 is set to a speed at which a torque required for closing-up the window W can be secured. The torque required for closing-up the window W is a torque that balances with the closing-up force Fb described with reference to FIG. 3B.

Together with the switch SW1, the switch SW3 corresponds to the position detection unit 12 in FIG. 1, is at an ON state until the switch SW1 is switched to the P2 side, and is at an OFF state in conjunction with the switch SW1 when the switch SW1 is switched to the P2 side (see FIG. 6).

FIG. 4 illustrates a control state when an upper end portion of the window W is in a region in front of the target speed switching position P1 in FIG. 7 (left side in FIG. 7). In this case, the switch SW1 is at a neutral position, the switch SW2 selects the normal target speed V1, and the switch SW3 is at an ON state. Therefore, the speed control unit 14 in FIG. 1 performs speed control (feedback control) based on the normal target speed V1.

Specifically, the speed control unit 14 calculates a deviation between the normal target speed V1 and the rotation speed of the motor 3 detected by the speed detection unit 11, determines a duty of a PWM signal generated by the PWM circuit 21 of the motor driving unit 2 so that the deviation becomes zero (that is, the rotation speed of the motor 3 becomes the normal target speed V1), and outputs the duty to the motor driving unit 2 as a control command. The PWM circuit 21 of the motor driving unit 2 generates a PWM signal having a commanded duty to operate the switching circuit 22, and an application voltage having a predetermined value is output from the switching circuit 22 to the motor 3. In this case, the application voltage is not held by the application voltage holding unit 15 in FIG. 1. Therefore, the application voltage of the motor 3 fluctuates according to the feedback control of the speed control unit 14.

After that, when the window W rises and the upper end portion of the window W reaches the target speed switching position P1 in FIG. 7, the state is shifted to a control state as illustrated in FIG. 5. In FIG. 5, the switch SW1 is switched to the P1 side, and the switch SW2 is also switched accordingly, and the closing-up time target speed V2 is selected. Since V1>V2 as described above, at the target speed switching position P1, the target speed is set lower than the target speed until that time. The speed control unit 14 performs feedback control of the motor speed, based on the closing-up time target speed V2. Also in this case, the application voltage of the motor 3 output from the motor driving unit 2 is not held by the application voltage holding unit 15.

When the window W further raises and the upper end portion of the window W reaches the speed control stop position P2 in FIG. 7, the state is shifted to a control state as illustrated in FIG. 6. In FIG. 6, the switch SW1 is switched to the P2 side, and the switch SW3 is turned off accordingly. Therefore, the output of the application voltage based on the speed control of the speed control unit 14 disappears, and the feedback control is stopped. On the other hand, the application voltage holding unit 15 holds the application voltage of the motor 3 at the time when the feedback control is stopped.

Specifically, the application voltage holding unit 15 continues to output the duty of the PWM signal corresponding to the motor application voltage at the time when the feedback control is stopped, to the motor driving unit 2 as a control command from the control unit 1. Therefore, the motor 3 is driven by the application voltage (holding voltage) having a certain value based on the duty, and rotates at a constant speed. Since the feedback control by the speed control unit 14 does not work while the application voltage is held, the rotation speed of the motor 3 does not increase due to the feedback control.

As described above, when the window W reaches the target speed switching position P1, the target speed is switched from V1 to V2 (that is, the target speed descends), and then when the window W reaches the speed control stop position P2, the feedback control is stopped and the motor application voltage at that time is held, so that it is possible to suppress the excess force Fc applied to the window W when the window W hits the upper run channel 50*c* as illustrated in FIG. 3C. This will be described in more detail with reference to FIG. 7.

In FIG. 7, a horizontal axis represents a position of the window W, and in a case where the window W is closed, the window position is changed from left to right. Until the window W reaches the target speed switching position P1, feedback control is performed based on the normal target speed V1. The target speed switching position P1 corresponds to a "first position" according to the embodiment of the present invention.

When the window W rises and reaches the target speed switching position P1, the target speed selection unit 13 in FIG. 1 switches the target speed from the normal target speed V1 to the closing-up time target speed V2, as described above. Therefore, the feedback control is performed so that the rotation speed of the motor 3 becomes the closing-up time target speed V2. In order to facilitate the transition to this feedback control, in FIG. 7, instead of immediately switching the target speed from V1 to V2 at the position of P1, a target speed when the target speed is gradually reduced from the previous V1 to a certain value is set as the closing-up time target speed V2. Since V2 is smaller than V1, the rotation speed of the motor 3 decreases after the target speed is switched, and an ascending speed of the window W also decreases accordingly. On the other hand, even when the window W reaches the target speed switching position P1, as before, only the normal load force Fa in FIGS. 3A to 3C acts on the window W, so that the motor output (torque) is not changed (motor output=normal load force Fa).

When the window W further rises and reaches the speed control stop position P2, as described above, the speed control unit 14 stops the feedback control, and the application voltage holding unit 15 holds the application voltage to the motor 3 at this time. Therefore, after that, the motor 3 rotates at a constant speed, and the window W also rises at a constant speed. Further, even at this point, since a force acting on the window W is only the normal load force Fa, the motor output is not changed (motor output=normal load force Fa). The speed control stop position P2 corresponds to a "second position" according to the embodiment of the present invention.

Next, when the window W further rises and reaches a position P3 in contact with the upper run channel 50*c*, the rotation of the motor 3 is continued, and a frictional force due to the contact between the window W and the run channel 50*c* begins acting, so that thereafter, the motor speed gradually decreases, and the motor output (torque) increases according to the frictional force.

Next, when the window W reaches a closing-up position P4 (state in FIG. 3B), although the rotation of the motor 3 is continued, the motor speed is further reduced, while the motor output is further increased, due to the action of the closing-up force Fb required for closing-up the window W (motor output=normal load force Fa+closing-up force Fb).

Even after the window W reaches the closing-up position P4, the motor 3 rotates while the application voltage is held, so that the window W rises beyond the closing-up position P4 to a stop position P5. When the window W reaches the stop position P5, the window W is pressed against the run channel 50*c* and cannot rise, so that the motor 3 stalls and stops (locked state). At the same time, the application voltage holding unit 15 stops holding the application voltage, and the voltage from the motor driving unit 2 is not supplied to the motor 3. As a result, the window W stops at the stop position P5 (state in FIG. 3C).

At the stop position P5, although the collision between the window W and the run channel 50*c* causes the excess force Fc, which is a reaction force, this excess force Fc is smaller than in the related art. That is, as illustrated by an alternate long and short dash line in FIG. 7, in a case where the control according to the embodiment of the present invention (decrease in target speed and stop of feedback control) is not performed, the speed of the motor 3 does not decrease up to the upper run channel contact position P3, so that a time until the motor 3 stops becomes longer, and the window W stops at a stop position P6 beyond the stop position P5. Therefore, at the stop position P6, the reaction force from the run channel 50*c*, that is, the excess force Fc becomes large.

On the other hand, in a case of the embodiment of the present invention, as illustrated by a solid line, the target speed descends at the target speed switching position P1, so that the motor 3 stops at the stop position P5 before the stop position P6. Therefore, the excess force Fc at the stop position P5 is reduced by the amount indicated by a symbol y. Meanwhile, even when the window W stops at the stop position P5, a force required for closing-up (closing-up force Fb) is secured, so that the closing-up of the window W is not incomplete.

Further, in a case where the control according to the embodiment of the present invention is not performed, as described at the beginning, when the speed of the motor 3 falls below a target speed immediately before the closing-up position P4, the feedback control works and the application voltage of the motor 3 rises, so that the window W vigorously hits the run channel 50*c*. Therefore, although the door of the vehicle may be deformed by the strong excess force Fc, according to the embodiment of the present invention, the feedback control does not work from the speed control stop position P2, so that the speed of the motor 3 increases immediately before the closing-up position P4, and there is no possibility that the above-described malfunction will occur.

As described above, in the power window apparatus 100 according to the first embodiment, between the target speed switching position P1 and the speed control stop position P2, the target speed of the motor 3 is set to a speed (closing-up time target speed V2) at which a torque required for closing-up the window W can be secured, and feedback control is performed based on the target speed. Further, at the speed control stop position P2, the feedback control is stopped, and the motor 3 rotates at a constant speed due to the application voltage held at this time. As a result, the window W hits the run channel 50*c* at the minimum necessary speed, and the application voltage to the motor 3 does not increase immediately before the closing-up position P4, and the motor speed does not increase, by the feedback control being stopped, so that the excess force Fc acting on the window W from the run channel 50*c* is suppressed. Meanwhile, since a force required for closing-up the window W (closing-up force Fb) is secured, the window W can be reliably closed.

Figure 8:
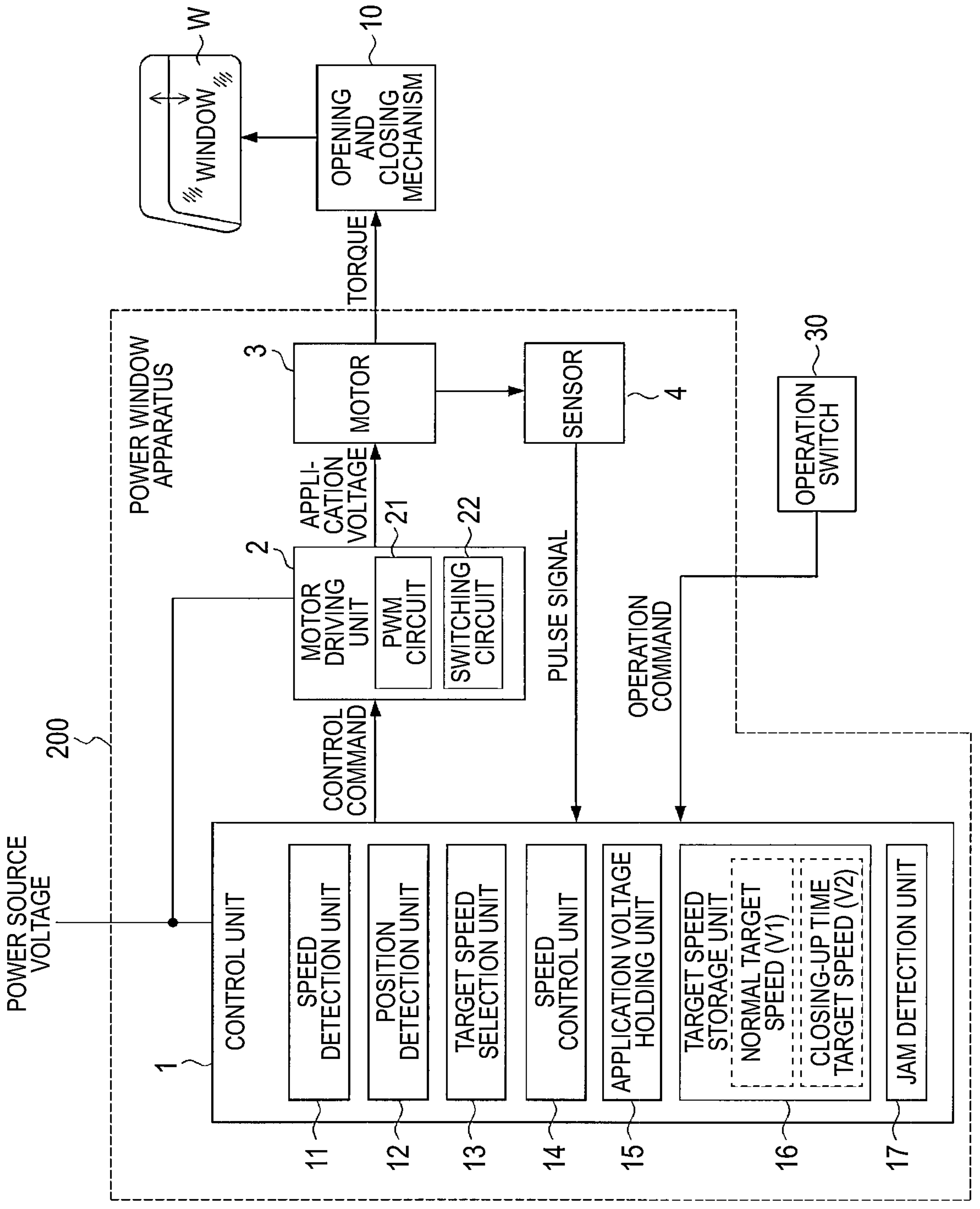
FIG. 8 is a block diagram illustrating a second embodiment of the present embodiment.

FIG. 8 illustrates a power window apparatus according to a second embodiment of the present embodiment. A power window apparatus 200 is different from the power window apparatus 100 (FIG. 1) according to the first embodiment in that a jam detection unit 17 is provided in the control unit 1. Since other configurations have the same manner as the configurations in the first embodiment, the same parts as those in FIG. 1 are designated by the same reference numerals, and duplicate description will be omitted.

The jam detection unit 17 is a block that detects that a foreign object is jammed during a closing operation of the window W. Since a method of detecting the jam is well known, the description thereof is omitted here. The jam detection is not performed over the entire moving region of the window W, and a prohibition region for prohibiting detection by the jam detection unit 17 is set in front of the closing-up position P4 (FIG. 7). This is since a motor speed decreases at the time of closing, so that it is possible to avoid erroneously detecting that the jam occurs. In the second embodiment, a position when the window W reaches the prohibition region is set as the speed control stop position P2. As a result, it is possible to stop feedback control by using an existing signal (detection prohibition signal) output from the position detection unit 12 when the window W reaches the prohibition region.

Figure 9:
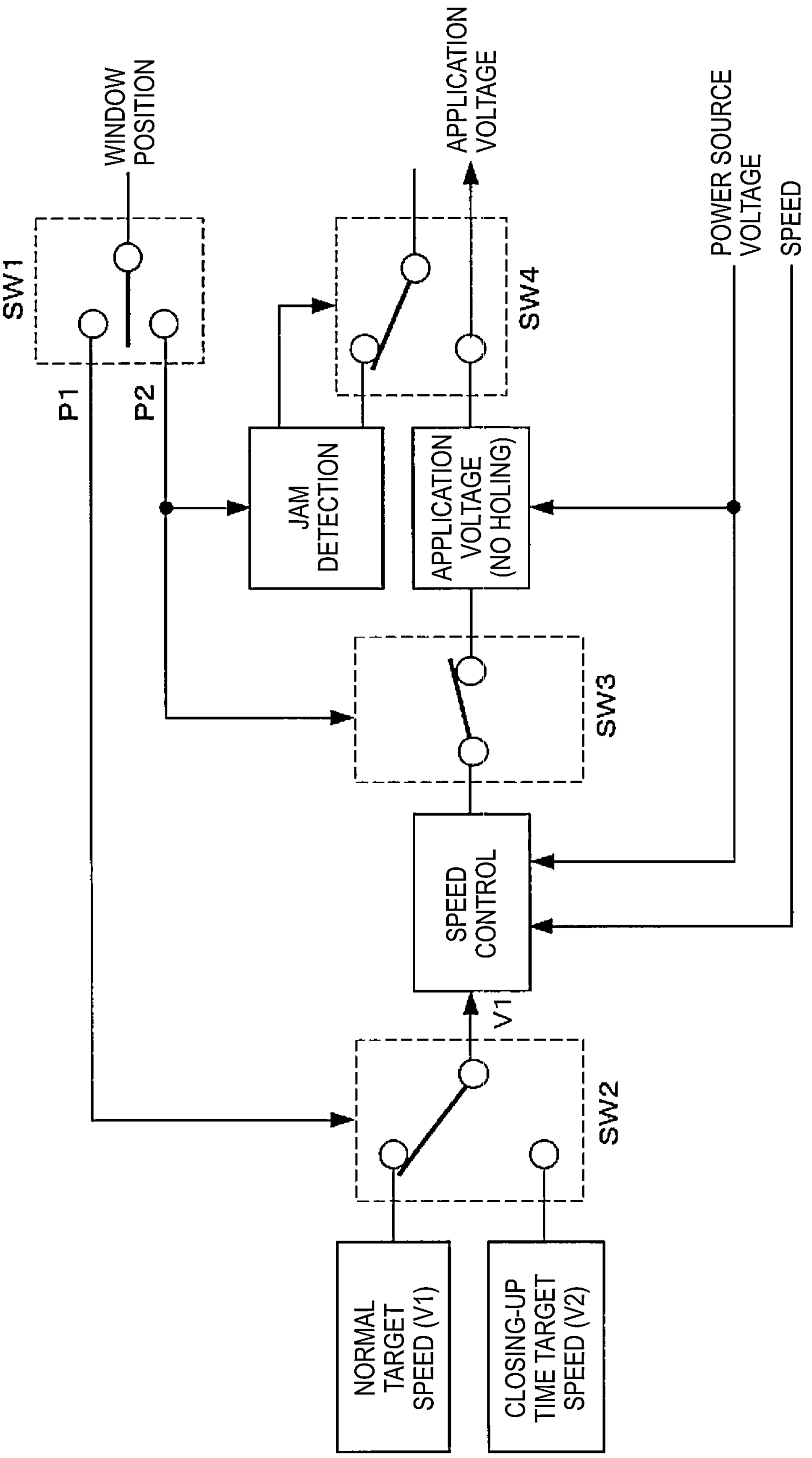
FIG. 9 is a diagram illustrating a control procedure according to the second embodiment.
Figure 10:
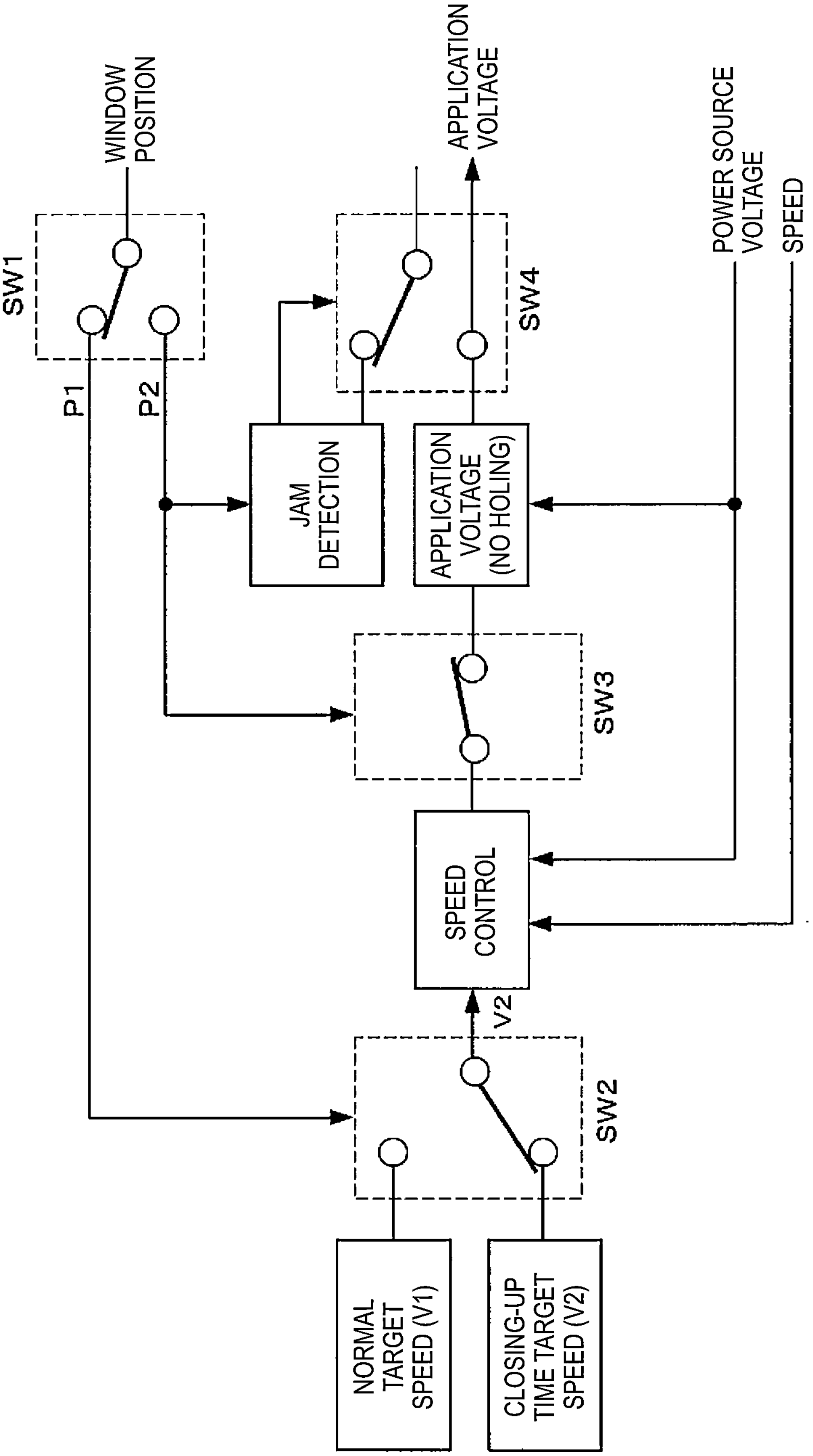
FIG. 10 is a diagram illustrating a control procedure following the continuation in FIG. 9.
Figure 11:
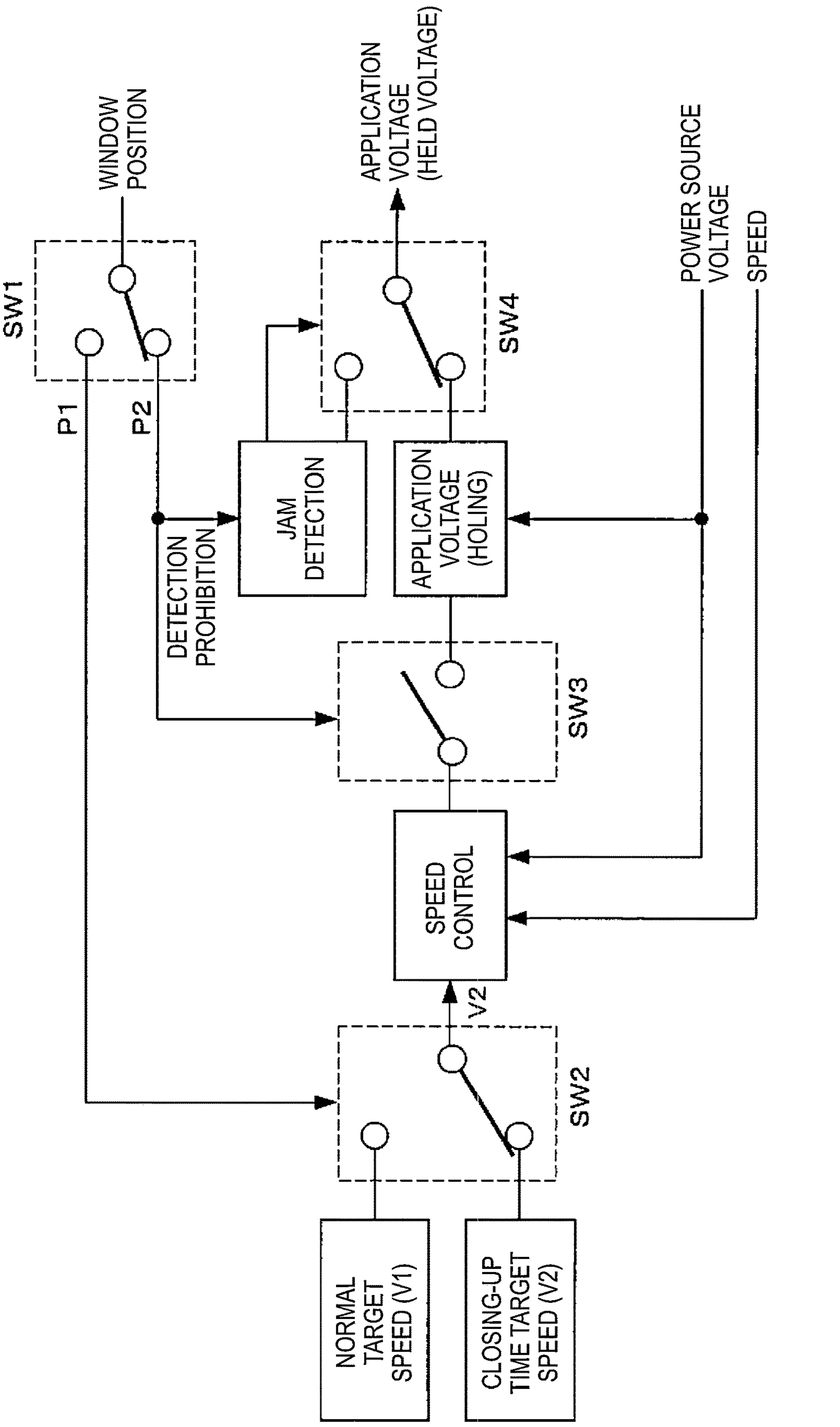
FIG. 11 is a diagram illustrating a control procedure following the continuation in FIG. 10.

FIGS. 9 to 11 are diagrams illustrating a control procedure by the control unit 1 in FIG. 8. The switches SW1 to SW3 have the same manner as the switches SW1 to SW3 in FIGS. 4 to 6. The switch SW4 is a switch that performs switching based on the above-described detection prohibition signal.

FIG. 9 illustrates a control state when an upper end portion of the window W is in a region in front of the target speed switching position P1 in FIG. 7. In this case, the switch SW1 is at a neutral position, the switch SW2 selects the normal target speed V1, the switch SW3 is at an ON state, and the switch SW4 is not switched. Therefore, the speed control unit 14 in FIG. 8 performs speed control (feedback control) based on the normal target speed V1. In this case, the application voltage holding unit 15 does not hold an application voltage of the motor 3.

After that, when the upper end portion of the window W reaches the target speed switching position P1 in FIG. 7, the state is shifted to a control state as illustrated in FIG. 10. In FIG. 10, the switch SW1 is switched to the P1 side, the switch SW2 is also switched, and the closing-up time target speed V2 is selected. The speed control unit 14 performs speed feedback control based on the closing-up time target speed V2. Also in this case, the application voltage holding unit 15 does not hold the application voltage of the motor 3.

When the window W further raises and the upper end portion of the window W reaches the speed control stop position P2 in FIG. 7, the state is shifted to a control state as illustrated in FIG. 11. In FIG. 11, the switch SW1 is switched to the P2 side, the switch SW3 is turned off accordingly, and the switch SW4 is switched based on the detection prohibition signal. Therefore, the output of the application voltage based on the speed control of the speed control unit 14 disappears, and the feedback control is stopped. On the other hand, the application voltage holding unit 15 holds an application voltage of the motor 3 at this time, and the motor 3 rotates at a constant speed by the application voltage having a certain value.

In the same manner as the first embodiment, also in the power window apparatus 200 according to the second embodiment, the window W hits the run channel 50*c* at the minimum necessary speed, and the speed of the motor 3 does not increase immediately before the closing-up position P4, by the feedback control being stopped, so that the excess force Fc acting on the window W from the run channel 50*c* is suppressed. Meanwhile, since a force required for closing-up the window W (closing-up force Fb) is secured, the window W can be reliably closed.

In addition to the above-described embodiments, various embodiments such as the following can be adopted in the present invention.

In each of the above-described embodiments, the feedback control is performed based on the normal target speed V1 before the window W reaches the target speed switching position P1 in FIG. 7, and the application voltage of the motor 3 may be fixed to a maximum value and the motor 3 may be driven by the maximum voltage without performing the feedback control in a region before the target speed switching position P1.

Figure 12:
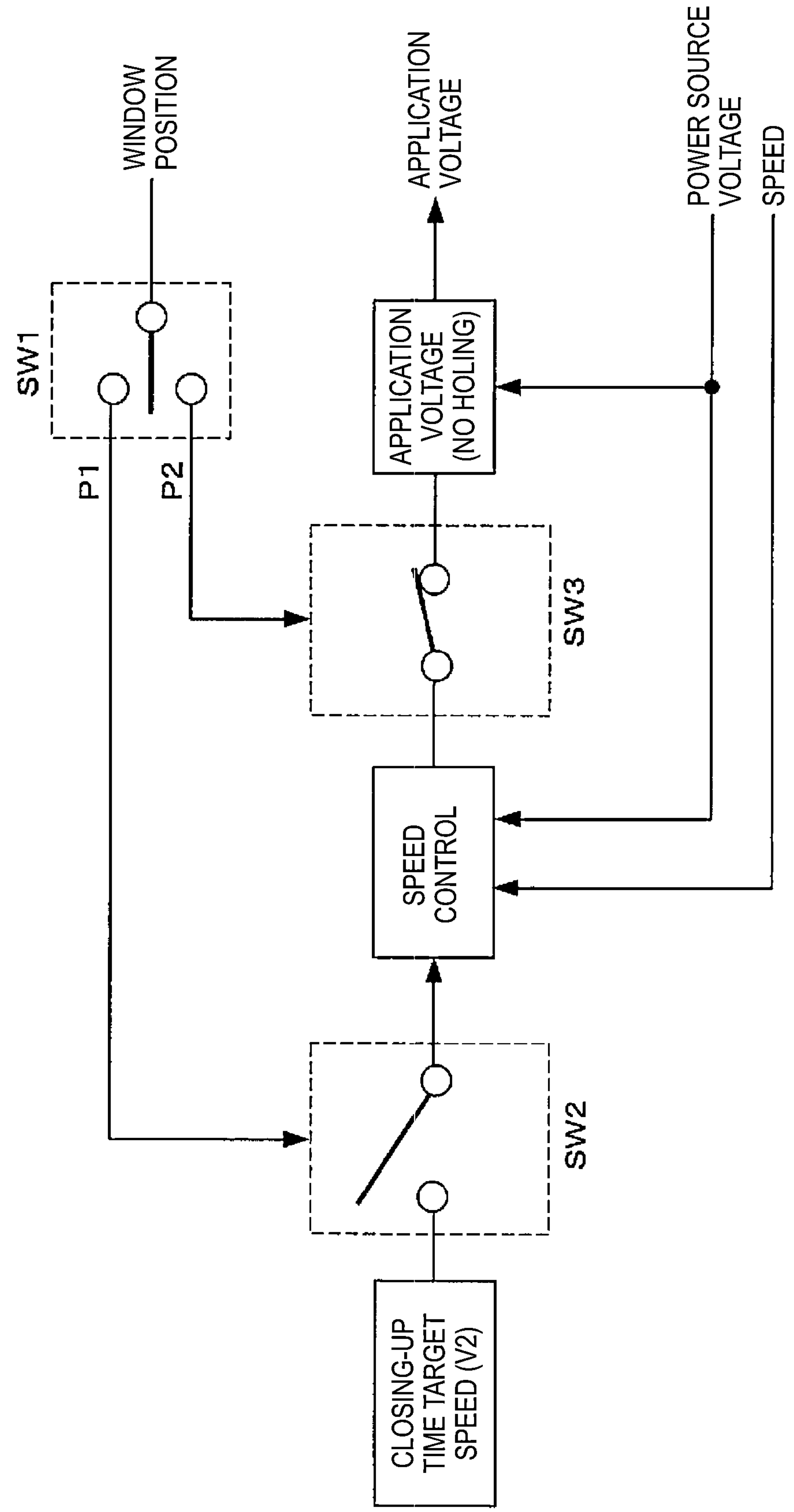
FIG. 12 is a diagram illustrating a modification example of the first embodiment.
Figure 13:
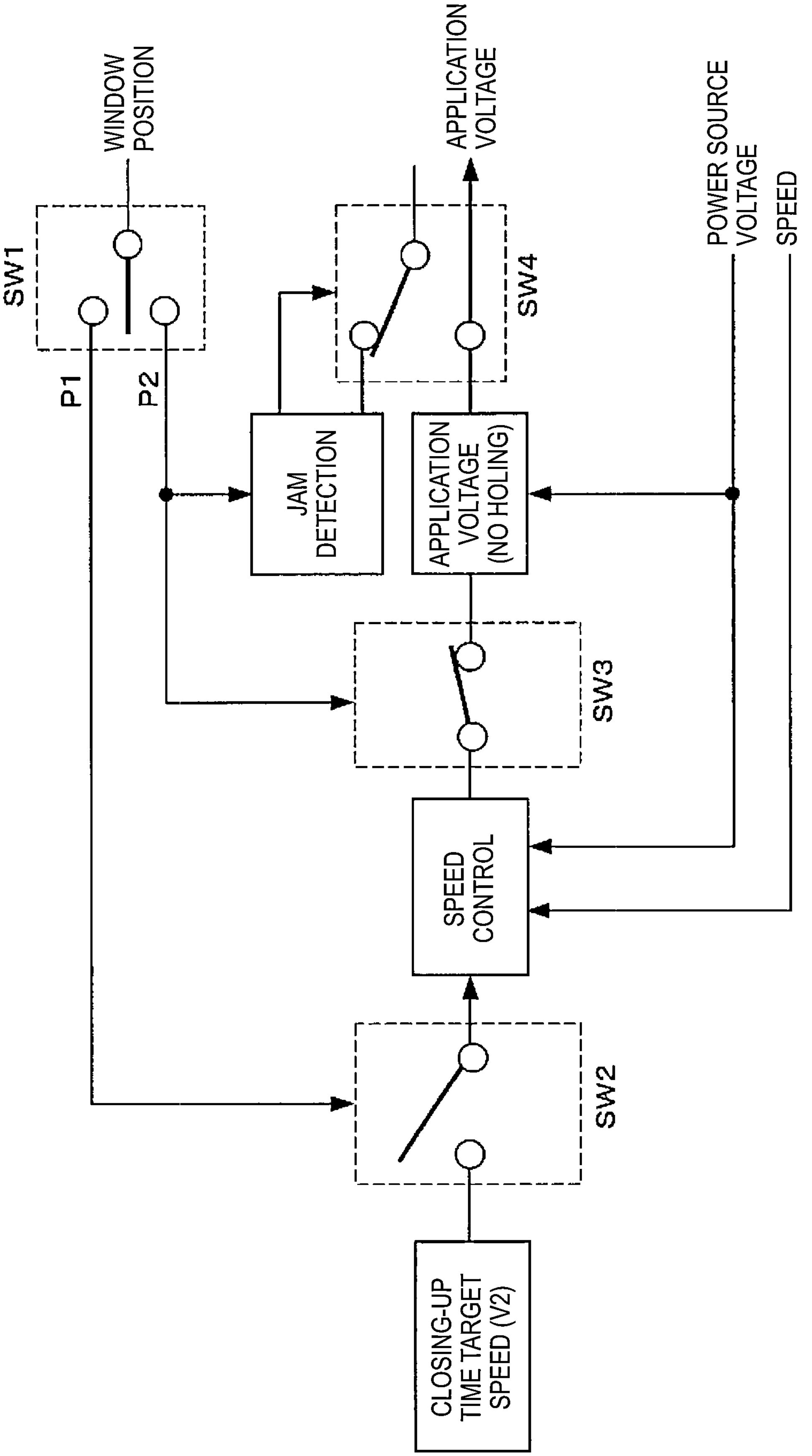
FIG. 13 is a diagram illustrating a modification example of the second embodiment.

In this case, as illustrated in FIG. 12 corresponding to FIG. 4 of the first embodiment, the switch SW2 is turned on when the window W reaches the target speed switching position P1, and only the closing-up time target speed V2 is selected. Further, as illustrated in FIG. 13 corresponding to FIG. 9 of the second embodiment, in this case as well, the switch SW2 selects only the closing-up time target speed V2.

Further, in each of the above-described embodiments, the sensor 4 such as a rotary encoder or a potentiometer is used to detect the rotation speed of the motor 3 or the position of the window W, and instead of the sensor 4, a current detection circuit that detects a current flowing through the motor 3 may be provided. The motor speed and the window position may be detected based on the ripple current (pulsating current) detected by the current detection circuit.

Further, in each of the above-described embodiments, the motor driving unit 2 is provided separately from the control unit 1, and the motor driving unit 2 may be incorporated into the control unit 1.

Further, in each of the above-described embodiments, the example in which the motor 3 is provided in the power window apparatus 100 is given, and the motor 3 may be provided separately from the power window apparatus 100.

Further, in FIGS. 2A and 2B, as an example of the opening and closing mechanism, the opening and closing mechanism 10 including the first drum 10*a* and the second drum 10*b*, the wire 10*c*, and the elevating member 10*d* is given as the example, and instead of this, for example, an opening and closing mechanism provided with an X-shaped arm as described in JP-A-2016-108807 may be used.

Further, in each of the above-described embodiments, as an opening and closing body control apparatus, the power window apparatus for vehicle is given as an example, and the embodiment of the present invention can also be applied to an apparatus that controls opening and closing of a sunroof of a vehicle or the like. Further, the embodiment of the present invention can be applied to various control apparatuses for opening and closing bodies in fields other than vehicles.

While the invention has been described with respect to a limited number of embodiments, those skilled in the art, having benefit of this disclosure, will appreciate that other embodiments can be devised which do not depart from the scope of the invention as disclosed herein. According, the scope of the invention should be limited only by the attached claims.

The invention claimed is:

1. An opening and closing body control apparatus comprising:

a motor driving unit that drives a motor to open and close an opening and closing body; and a control unit that controls an operation of the motor driving unit, wherein the motor driving unit outputs a predetermined application voltage to the motor, based on a control command from the control unit, and wherein the control unit is configured to:

when the opening and closing body reaches a first position before a closing-up position, set a target speed of the motor to a closing-up time target speed at which a torque has sufficient force for closing-up the opening and closing body against an upper run channel, and perform feedback control on the motor driving unit, wherein the closing-up position is a position where no gap exists between the opening and closing body and the upper run channel, and when the opening and closing body reaches a second position closer to the closing-up position than the first position, stop the feedback control, and control the motor driving unit so that the application voltage of the motor at the time of stopping the feedback control is held.

2. The opening and closing body control apparatus according to claim 1, wherein the motor driving unit is configured to:

output the held application voltage to the motor during a time from when the opening and closing body reaches the second position to when the opening and closing body reaches a stop position, which is farther into the upper run channel than the closing-up position, and when the opening and closing body reaches the stop position and stops, stop the output of the held application voltage.

3. The opening and closing body control apparatus according to claim 1, wherein the control unit is configured to:

while the opening and closing body is between a fully open position and the first position, perform feedback control on the motor driving unit, based on a normal target speed larger than the closing-up time target speed.

4. The opening and closing body control apparatus according to claim 1, wherein the control unit is configured to:

while the opening and closing body is between a fully open position and the first position, control the motor driving unit so that the application voltage of the motor becomes a maximum voltage.

5. The opening and closing body control apparatus according to claim 1, further comprising:

a jam detection unit that detects that a foreign object is jammed during a closing operation of the opening and closing body, wherein a prohibition region for prohibiting detection by the jam detection unit is between the first position and the closing-up position of the opening and closing body, and wherein the second position is a position of the opening and closing body when the opening and closing body reaches the prohibition region.

* * * * *